(12) United States Patent
Obara (10) Patent No.: US 11,753,020 B2
(45) Date of Patent: Sep. 12, 2023

(54) UPDATE SYSTEM AND ELECTRONIC CONTROL DEVICE

(71) Applicant: HITACHI AUTOMOTIVE SYSTEMS, LTD., Hitachinaka (JP)

(72) Inventor: Kiyohiro Obara, Tokyo (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 345 days.

(21) Appl. No.: 17/267,055

(22) PCT Filed: Aug. 7, 2019

(86) PCT No.: PCT/JP2019/031267
§ 371 (c)(1),
(2) Date: Feb. 9, 2021

(87) PCT Pub. No.: WO2020/045019
PCT Pub. Date: Mar. 5, 2020

(65) Prior Publication Data
US 2021/0291842 A1 Sep. 23, 2021

(30) Foreign Application Priority Data
Aug. 27, 2018 (JP) .................................. 2018-158798

(51) Int. Cl.
*B60W 40/09* (2012.01)
*G05D 1/00* (2006.01)
(Continued)

(52) U.S. Cl.
CPC ........... *B60W 40/09* (2013.01); *G05D 1/0088* (2013.01); *G07C 5/008* (2013.01); *G07C 5/02* (2013.01);
(Continued)

(58) Field of Classification Search
CPC ........... B60W 40/09; B60W 2540/043; B60W 2540/30; B60W 2552/30; B60W 2556/45;
(Continued)

(56) References Cited

U.S. PATENT DOCUMENTS

| 5,521,823 A | 5/1996 | Akita et al. |
| 2015/0158486 A1* | 6/2015 | Healey .................. B60W 30/16 701/23 |

(Continued)

FOREIGN PATENT DOCUMENTS

| JP | 05-058198 A | 3/1993 |
| JP | 2009-227196 A | 10/2009 |
| JP | 2017-154725 A | 9/2017 |

OTHER PUBLICATIONS

Basu et al.; Do You Want Your Autonomous Car To Drive Like You?; HRI '17, Mar. 6-9, 2017, Vienna, Austria; pp. 417-425 (Year: 2017).*

(Continued)

*Primary Examiner* — Michael J Zanelli
(74) *Attorney, Agent, or Firm* — Volpe Koenig (57) ABSTRACT

An update system includes an electronic control device that stores an autonomous driving logic and a server. The server includes: a storage unit storing personal characteristic data based on a user's driving and associated driving result data. In creating a first personal characteristic data associated with a first user ID and a first position, if first driving result data is present, the personal characteristic creating unit creates the first personal characteristic data using the first driving result data. If the first driving result data is not present, the personal characteristic creating unit creates the first personal characteristic data using the driving result data or the personal characteristic data associated with a user ID specified for the first user ID by the similarity specifying unit and the first position. The electronic control device includes a (Continued)

personal characteristic updating unit configured to update the autonomous driving logic using the first personal characteristic.

7 Claims, 8 Drawing Sheets

(51) Int. Cl.
  *G07C 5/00* (2006.01)
  *G07C 5/02* (2006.01)
(52) U.S. Cl.
  CPC ... *B60W 2540/043* (2020.02); *B60W 2540/30* (2013.01); *B60W 2552/30* (2020.02); *B60W 2556/45* (2020.02)
(58) Field of Classification Search
  CPC ..... B60W 50/08; G05D 1/0088; G07C 5/008; G07C 5/02; G08G 1/0112; G08G 1/0141; G08G 1/096716; G08G 1/096741; G08G 1/096775; G08G 1/0129
  See application file for complete search history.

(56) References Cited

U.S. PATENT DOCUMENTS

| | | |
|---|---|---|
| 2018/0105186 A1 | 4/2018 | Motomura et al. |
| 2018/0170392 A1* | 6/2018 | Yang .................. G01C 21/3679 |
| 2018/0281810 A1* | 10/2018 | Tochioka .......... B60W 50/0098 |
| 2019/0079514 A1* | 3/2019 | Zhu .................... G01C 21/3837 |

OTHER PUBLICATIONS

Bellum et al.; Comfort in automated driving: An analysis of preferences for different automated driving styles and their dependence on personality traits; Transportation Research Part F 55 (2018) 90-100; Mar. 15, 2018 (Year: 2018).*

International Search Report, PCT/JP2019/031267, dated Nov. 5, 2019, 1 pg.

* cited by examiner

| USER ID | A | A | B | B | ... |
|---|---|---|---|---|---|
| TIME | 2017/1/1 12:35:40 | 2017/1/1 12:35:41 | 2017/2/1 18:55:40 | 2017/2/1 18:55:41 | ... |
| LATITUDE AND LONGITUDE OF OWN VEHICLE | 139.7337639, 35.66939167 | 139.7337639, 35.66939167 | 139.7337639, 35.66939167 | 139.7337639, 35.66939167 | ... |
| LOCATION ON LANE (LANE-LEVEL MAP) | Lane_id=101, length=20m | Lane_id=101, length=30m | Lane_id=981, length=10m | Lane_id=981, length=16m | ... |
| STEERING WHEEL ANGLE | 1.0 | 1.3 | 0.0 | 0.1 | ... |
| ACCELERATOR OPENING | 0.48 | 0.48 | 0.88 | 0 | ... |
| BRAKE STRENGTH | 0.0 | 0.0 | 0.0 | 0.81 | ... |
| OWN VEHICLE SPEED (km/h) | 38.5 | 41.3 | 33.2 | 13.6 | ... |
| OWN VEHICLE ACCELERATION (m/s$^2$) | 0.01 | 0.03 | 0.08 | −0.21 | ... |
| WEATHER | FINE | FINE | RAIN | RAIN | ... |
| BRIGHTNESS (LUX) | 751 | 698 | 35 | 42 | ... |
| ... | ... | ... | ... | ... | ... |

(a) DRIVING RESULT DATA (OWN VEHICLE DATA)

201 / 212

| USER ID | A | A | A | B | B | B | ... |
|---|---|---|---|---|---|---|---|
| IDS OF OTHER OBJECTS | 901 | 901 | 910 | 501 | 502 | 503 | ... |
| TIME | 2017/1/1 12:35:40 | 2017/1/1 12:35:41 | 2017/1/1 12:35:41 | 2017/2/1 18:55:40 | 2017/2/1 18:55:40 | 2017/2/1 18:55:41 | ... |
| TYPES OF OTHER OBJECTS | PASSENGER CAR | PASSENGER CAR | ROAD MARKING · WHITE LINE | TRAFFIC LIGHT | PEDESTRIAN | PEDESTRIAN | ... |
| POSITIONS OF OTHER OBJECTS (RELATIVE POSITIONS m) | (10.5, −8.3) | (12.5, −8.3) | (10, 2.53) | (20.2, 2) | (10.5, 2.3) | (8.3, 2.5) | ... |
| SPEEDS OF OTHER OBJECTS | 45.3 | 45.3 | — | — | 4.8 | 4.8 | ... |
| MOVING ANGLES OF OTHER OBJECTS | 0.0 | 0.0 | — | — | 0 | 270 | ... |
| STATES OF OTHER OBJECTS | MOVING | MOVING | — | BLUE | MOVING | MOVING | ... |

(b) DRIVING RESULT DATA (SURROUNDING ENVIRONMENT DATA)

| LANE NUMBER | SERIAL NUMBER | CONDITION | CONTROL CONTENTS |
|---|---|---|---|
| 421   4 0 1 | 1 | 0.87 SECONDS < THW INTERVAL OF VEHICLE AT FRONT PLACE OF MAIN LANE < 2.86 SECONDS, AND 1.37 SECONDS < THW INTERVAL OF VEHICLE AT REAR PLACE OF MAIN LANE < 2.39 SECONDS | MAINTAIN SPEED AND MERGE BETWEEN VEHICLES ON MAIN LANE |
| 422   4 0 1 | 2 | THW INTERVAL OF VEHICLE AT FRONT PLACE OF MAIN LANE ≤ 0.87 SECONDS, AND THW INTERVAL OF VEHICLE AT MORE FRONT PLACE OF MAIN LANE ≥ 3.73 SECONDS | OVERTAKE VEHICLE ON MAIN LANE AND MERGE |
| 423   4 0 1 | 3 | THW INTERVAL OF VEHICLE AT FRONT PLACE OF MAIN LANE ≤ 0.877 SECONDS, THW INTERVAL OF VEHICLE AT MORE FRONT PLACE OF MAIN LANE ≤ 3.73 SECONDS, THW INTERVAL OF VEHICLE AT REAR PLACE OF MAIN LANE ≤ 1.37 SECONDS, AND THW INTERVAL OF VEHICLE BEHIND VEHICLE AT REAR PLACE OF MAIN LANE > 3.76 SECONDS | DECELERATE AND MERGE BEHIND VEHICLE AT REAR PLACE OF MAIN LANE |
| 424   4 0 1 | 4 | BRIGHTNESS < 100 LUX, 1.87 SECONDS < THW INTERVAL OF VEHICLE AT FRONT PLACE OF MAIN LANE < 3.86 SECONDS, AND 2.37 SECONDS < THW INTERVAL OF VEHICLE AT REAR PLACE OF MAIN LANE < 3.39 SECONDS | MAINTAIN SPEED AND MERGE BETWEEN VEHICLES ON MAIN LANE |
| 425   4 0 1 | 5 | 7:35 < TIME < 9:28, 0.57 SECONDS < THW INTERVAL OF VEHICLE AT FRONT PLACE OF MAIN LANE < 2.86 SECONDS, AND 0.97 SECONDS < THW INTERVAL OF VEHICLE AT REAR PLACE OF MAIN LANE < 2.39 SECONDS | MAINTAIN SPEED AND MERGE BETWEEN VEHICLES ON MAIN LANE |
| ... | | ... | ... |

(a) PERSONAL CHARACTERISTIC DATA (b) TARGET ROAD MAP

| ROAD/INTERSECTION NUMBER | USER ID | PERSONAL CHARACTERISTIC DATA |
|---|---|---|
| 7 0 1 | A | a |
| 7 0 1 | B | a |
| 7 0 1 | C | a |
| 7 0 1 | D | a |
| 7 0 1 | E | m |
| 7 0 2 | A | c |
| 7 0 2 | B | c |
| 7 0 2 | C | c |
| 7 0 2 | D | c |
| 7 0 2 | E | w |
| 7 0 3 | A | b |
| 7 0 3 | B | b |
| 7 0 3 | C | b |
| 7 0 3 | D | b |
| 7 0 3 | E | k |

| ROAD/INTERSECTION NUMBER | USER ID | PERSONAL CHARACTERISTIC DATA |
|---|---|---|
| 7 0 4 | A | d |
| 7 0 4 | B | d |
| 7 0 4 | C | x |
| 7 0 4 | D | d |
| 7 0 4 | E | x |
| 7 0 5 | A | NOT CREATED |
| 7 0 5 | B | y |
| 7 0 5 | C | z |
| 7 0 5 | D | y |
| 7 0 5 | E | z |

UPDATE SYSTEM AND ELECTRONIC CONTROL DEVICE

TECHNICAL FIELD

The present invention relates to an update system and an electronic control device.

BACKGROUND ART

A parameter of a driving characteristic of a vehicle differs depending on a skill level, personality, and the like of a driver. The parameter includes, for example, a distance to an oncoming vehicle when the vehicle turns left or right, distances and relative speeds to vehicles in front of and behind the vehicle when the vehicle merges with the vehicles, and a deceleration start timing when the vehicle stops at a traffic light. On the other hand, as a driving characteristic in a vehicle control logic of an autonomous vehicle, an average value of driving characteristics of all people is adopted. Therefore, if a characteristic of a vehicle control logic of an autonomous vehicle matches a characteristic of a driver, the driver feels comfortable driving, but if the characteristic does not match the characteristic of the driver, it may cause anxiety, discomfort, or the like. That is, matching a characteristic of a control logic of an autonomous driving with the characteristic of the individual driver of the vehicle greatly contributes to improvement of safety, security, comfort and added value of the autonomous vehicle. PTL 1 discloses a learning control vehicle including a detecting unit that detects a running condition of a vehicle, a running characteristic control unit capable of controlling a running characteristic of the vehicle with a predetermined control gain, and a control unit that learns the running characteristic of the vehicle and changes the control gain of the running characteristic control unit, in which a driver identifying unit that identifies a specific driver is provided, and the control unit is configured to change the control gain of the running characteristic control unit in accordance with a learning program obtained by at least a learning operation of a driver based on an identity signal of the driver identification unit.

CITATION LIST

Patent Literature

PTL 1: JP-A-5-58198

SUMMARY OF INVENTION

Technical Problem

In the invention described in PTL 1, it is not possible to control a vehicle according to a characteristic of a user on a road where the user is not manually driving.

Solution to Problem

An update system according to a first aspect of the invention is an update system including an electronic control device that stores an autonomous driving logic and a server. The server includes: a storage unit configured to store, in association with each combination of a user ID that identifies a user and a position on a road, personal characteristic data that is a part of the autonomous driving logic based on driving of a user and driving result data that is a record of driving of a user; a personal characteristic creating unit configured to create the personal characteristic data; a similarity specifying unit configured to specify, for each target ID which is the user ID to be evaluated for similarity, a user ID associated with the personal characteristic data or the driving result data which is highly similar to the personal characteristic data or the driving result data associated with the target ID at a plurality of positions; and an output unit configured to output the personal characteristic data created by the personal characteristic creating unit to the electronic control device. In creation of a first personal characteristic data associated with a first user ID and a first position, if first driving result data which is the driving result data associated with the first user ID and the first position is present, the personal characteristic creating unit creates the first personal characteristic data using the first driving result data, and if the first driving result data is not present, the personal characteristic creating unit creates the first personal characteristic data using the driving result data or the personal characteristic data associated with a user ID specified for the first user ID by the similarity specifying unit and the first position. The electronic control device includes a personal characteristic updating unit configured to update the autonomous driving logic using the first personal characteristic data created by the personal characteristic creating unit.

An electronic control device according to a second aspect of the invention includes: a storage unit that has an autonomous driving logic including, for a plurality of positions, personal characteristic data created for each user in association with a position on a road; an input unit to which the personal characteristic data is received from a server; a personal characteristic update unit configured to update the autonomous driving logic using the personal characteristic data input to the input unit; a vehicle control unit configured to control a vehicle using the autonomous driving logic, and an output unit configured to output driving result data including position information, which is a record of driving when the vehicle is driven by an operation of a user, to the server together with information for identifying a user. The personal characteristic data input from the server includes the personal characteristic data for a position where a vehicle is not driven by an operation of the user, which is the personal characteristic data created based on the personal characteristic data or the driving result data of another user whose personal characteristic data or driving result data is similar to that of the user at a plurality of positions.

Advantageous Effect

According to the invention, it is possible to control a vehicle according to a characteristic of a user even on a road where the user is not manually driving.

DESCRIPTION OF EMBODIMENTS

Embodiment

Hereinafter, an embodiment of an update system will be described with reference to FIGS. 1 to 8.
(System Configuration)

Figure 1:
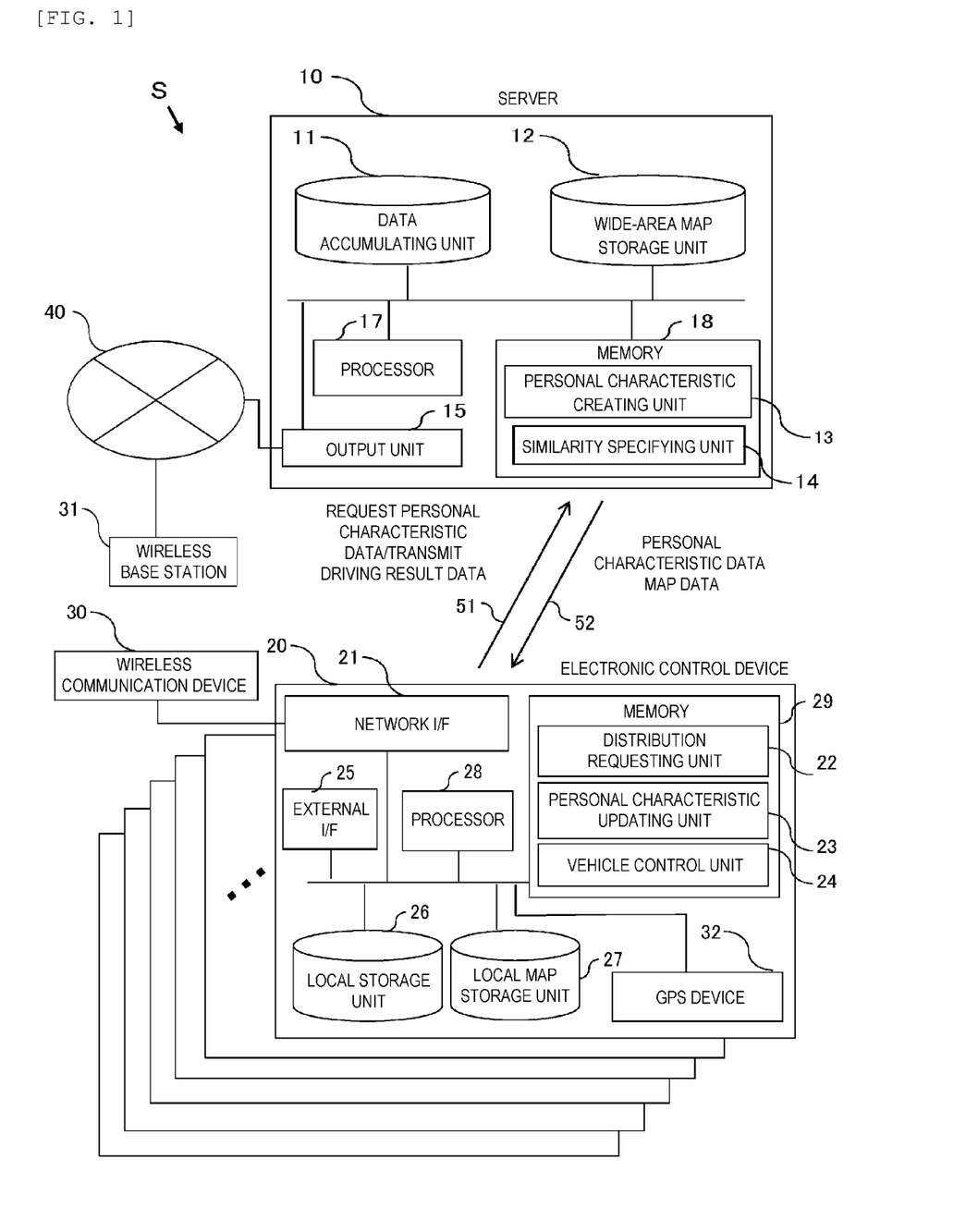
FIG. 1 is a block diagram showing an outline of an update system.

FIG. 1 is a block diagram showing an outline of an update system. An update system S includes a server 10 owned by an autonomous driving function service provider and a plurality of electronic control devices 20, and the server 10 and the electronic control device 20 are connected by a network 40. Each electronic control device 20 is mounted on a different vehicle, and all of the electronic control devices 20 communicate with the same server 10. The electronic control device 20 is connected to the network 40 by a wireless communication device 30 via a wireless base station 31. The wireless communication device 30 may be built in the electronic control device 20.

The server 10 stores driving result data at each time of each vehicle received from the electronic control device 20 in a data accumulating unit 11. The driving result data is control operation information of a vehicle, and includes, for example, an operation by a steering wheel, an accelerator, a brake, or the like, and vehicle speed. Surrounding environment data is information including information on a relative distance and speed to other vehicles and objects in the vicinity, which is acquired from a sensor mounted on a vehicle.

The server 10 includes a processor 17, a memory 18, an output unit 15 which is a network interface (hereinafter, abbreviated as "IF"), a data accumulating unit 11, and a wide-area map storage unit 12. The memory 18 stores a plurality of programs, and as functions realized by executing these programs by the processor 17, at least a personal characteristic creating unit 13 that processes the driving result data and the surrounding environment data and a similarity specifying unit 14 are provided. Processing realized by executing the programs by the processor 17 will be described later. In the following description, processing executed by the personal characteristic creating unit 13 or the like is actually executed by the processor 17 in accordance with programs of the personal characteristic creating unit 13 or the like.

The data accumulating unit 11 and the wide-area map storage unit 12 are, for example, a storage device such as a hard disk drive (HDD). The data accumulating unit 11 stores driving result data acquired from each electronic control device 20. The driving result data includes own vehicle data and surrounding environment data. The own vehicle data is driving result data at each time of each vehicle and control operation information of a vehicle. The own vehicle data includes a location of a vehicle represented by latitude and longitude, a place on a map, and the like, operating states of a steering wheel, an accelerator, and a brake, a vehicle speed, acceleration, and the like. The surrounding environment data is a situation around a vehicle obtained from a sensor mounted on each vehicle, and includes locations, distances, and speeds of other vehicles, a type and a location of a road marking (road paint), a location and a color of a traffic light, a location and a speed of a pedestrian or an obstacle, weather, sunshine, and the like.

The data accumulating unit 11 further stores personal characteristic data, which is driving characteristic data generated for each individual driver. A parameter of a driving characteristic of a vehicle differs depending on a skill level, personality, and the like of a driver. The parameter includes, for example, a distance to an oncoming vehicle when the vehicle turns right, distances and relative speeds to vehicles in front of and behind the vehicle when the vehicle merges with the vehicles, and a deceleration start timing when the vehicle stops at a traffic light. A parameter value in which such parameter in autonomous driving is matched with a characteristic of an individual is the personal characteristic data. This parameter differs for each place or lane on a map and each direction of travel, and is stored in association with a place or lane on autonomous driving map data. Details of the personal characteristic data will be described later.

The wide-area map storage unit 12 stores wide-area map information in which shapes and attributes are described with at least lane-level detail, which is necessary for autonomous driving. In this map information, lane data and attribute information are stored in addition to link data of all links constituting roads on the map. The "lane" here is a running area of a vehicle defined by vehicle lane markings, and is also called a "car lane". The lane data includes information such as lane interconnection information, a lane width, a lane centerline shape, and a lane type. The autonomous driving map data includes coordinate values and the like indicating locations and shapes of structures on the map such as roads and buildings. A map data storage unit 16 according to the present embodiment stores, as map data, at least road data indicating the location, shape, connection relation, or the like of the road and data of lane constituting the road.

In the present embodiment, in order to simplify description, it is assumed that each vehicle is always driven by the same user and the electronic control device 20 is always mounted on the same vehicle, and an ID of the electronic control device is used as identification information of the user, that is, a user ID. That is, it is assumed to be a combination in which the vehicle, the electronic control device 20, and the driver are all matched. However, the electronic control device 20 may identify each driver and assign an individual ID to each driver. In the present embodiment, a driver of a vehicle is also referred to as a "user", and when the vehicle is automatically driven, the driver of a vehicle is also referred to as a "driver" or a "user".

The function of the server 10 may be realized by a plurality of computers. For example, the data accumulating unit 11 and the wide-area map storage unit 12 are storage devices of different computers connected to the network 40, and the processors 17 of the different computers may execute processing described later based on data of those storage units.

The electronic control device 20 is a computer mounted on a vehicle, and performs various calculations according to programs, outputs an operation command to a vehicle part such as a steering wheel or an accelerator, and monitors speed and a state of a vehicle part such as the steering wheel. The electronic control device 20 is connected to an in-vehicle camera or a radar through an external I/F 25, receives information on surrounding environment which is an object or the like recognized by the camera or the radar, and performs vehicle control related to autonomous driving or driving support based on the information. Hereinafter, a typical configuration of the plurality of electronic control devices 20 will be described. Since configurations of the other electronic control devices 20 may be the same as that shown in FIG. 1, the illustration and description thereof will be omitted.

The electronic control device 20 includes a network IF 21 for connecting the electronic control device 20 to the network 40, a memory 29, a processor 28, the external IF 25 that is connected to an in-vehicle sensor or the like and can receive recognition information of the sensor, a GPS device 32, and a storage device such as an HDD or a flash memory. The memory 29 stores a plurality of programs, and as functions realized by executing these programs on a computer, at least a distribution requesting unit 22, a personal characteristic updating unit 23, and a vehicle control unit 24 are provided.

The storage device includes a local storage unit 26 and a local map storage unit 27. A vehicle control logic is stored in the local storage unit 26. The vehicle control logic is information required for automatically driving a vehicle equipped with the electronic control device 20, and includes a large amount of personal characteristic data created according to characteristics of users. The personal characteristic data describes control contents of vehicles according to situations, which is created based on past driving of users. The personal characteristic data is created, for example, for each intersection. The local map storage unit 27 stores map data having lane-level detail for autonomous driving. However, since the local map storage unit 27 has a limited storage capacity, the local map storage unit 27 stores only map data in a limited range, for example, a local area of 10 km square.

The GPS device 32 receives radio waves from a plurality of satellites constituting a satellite navigation system, and calculates, by analyzing signals contained in the radio waves, a location of the own vehicle, that is, latitude and longitude. The GPS device 32 outputs the calculated latitude and longitude to the processor 28.

The distribution requesting unit 22 requests an autonomous driving map distribution center or the like for a required range of autonomous driving map data based on the location of the own vehicle at a predetermined timing, and downloads a map for autonomous driving. The distribution requesting unit 22 may download an autonomous driving map at regular intervals, or may download an autonomous driving map at a timing when it is determined that the location of the own vehicle may deviate from a range of the already downloaded autonomous driving map. When downloading the autonomous driving map, the distribution requesting unit 22 also downloads the personal characteristic data of the user included in the range of the map. When this request is made, the driving result data collected and accumulated by the own vehicle is transmitted to the server 10.

The data transmitted at this time is stored in the data accumulating unit 11 of the server 10. The autonomous driving map and the personal characteristic data do not need to be downloaded at the same time. The autonomous driving map and the personal characteristic data may also be downloaded at different timings. The personal characteristic data stores related information of a location of the data on the map using the latitude and longitude, a unique identification number of a lane, or the like, and can also be managed independently of the map data. The downloaded autonomous driving map data is stored in the local map storage unit 27. The downloaded personal characteristic data is stored in the local storage unit 26.

The personal characteristic updating unit 23 updates the vehicle control logic stored in the local storage unit 26 using the personal characteristic data received from the server 10. Specifically, the vehicle control logic is updated by adding or overwriting the personal characteristic data corresponding to each place. As an example, the vehicle control logic stored in the local storage unit 26 already includes personal characteristic data for an intersection X, and when the personal characteristic data for the intersection X is newly received from the server 10, the vehicle control logic is updated by overwriting previous information using the received personal characteristic data.

The vehicle control unit 24 operates only when a vehicle is set to an autonomous driving mode, and does not operate in a manual driving mode in which a user controls the vehicle. A vehicle is controlled using the vehicle control logic stored in the local storage unit 26, the autonomous driving map data stored in the local map storage unit 27, and output of the GPS device 32.

The server 10 stores vehicle driving result data received from all of the electronic control devices 20 in the data accumulating unit 11. A large number of vehicles transmitting driving result data are present, and the data accumulating unit 11 accumulates a large amount of data transmitted from a large number of different vehicles. Since locations of the vehicle are specified at a lane level with respect to these data, driving result data for each lane can be obtained even on the same road.

The personal characteristic creating unit 13 of the server 10 analyzes the accumulated driving result data and creates personal characteristic data for each individual driver. The personal characteristic data is data that lists optimum vehicle control (operation) conditions and control contents according to surrounding situations in any lane on a road. A method of creating the personal characteristic data will be described later.

(Driving Result Data)

Figure 2:
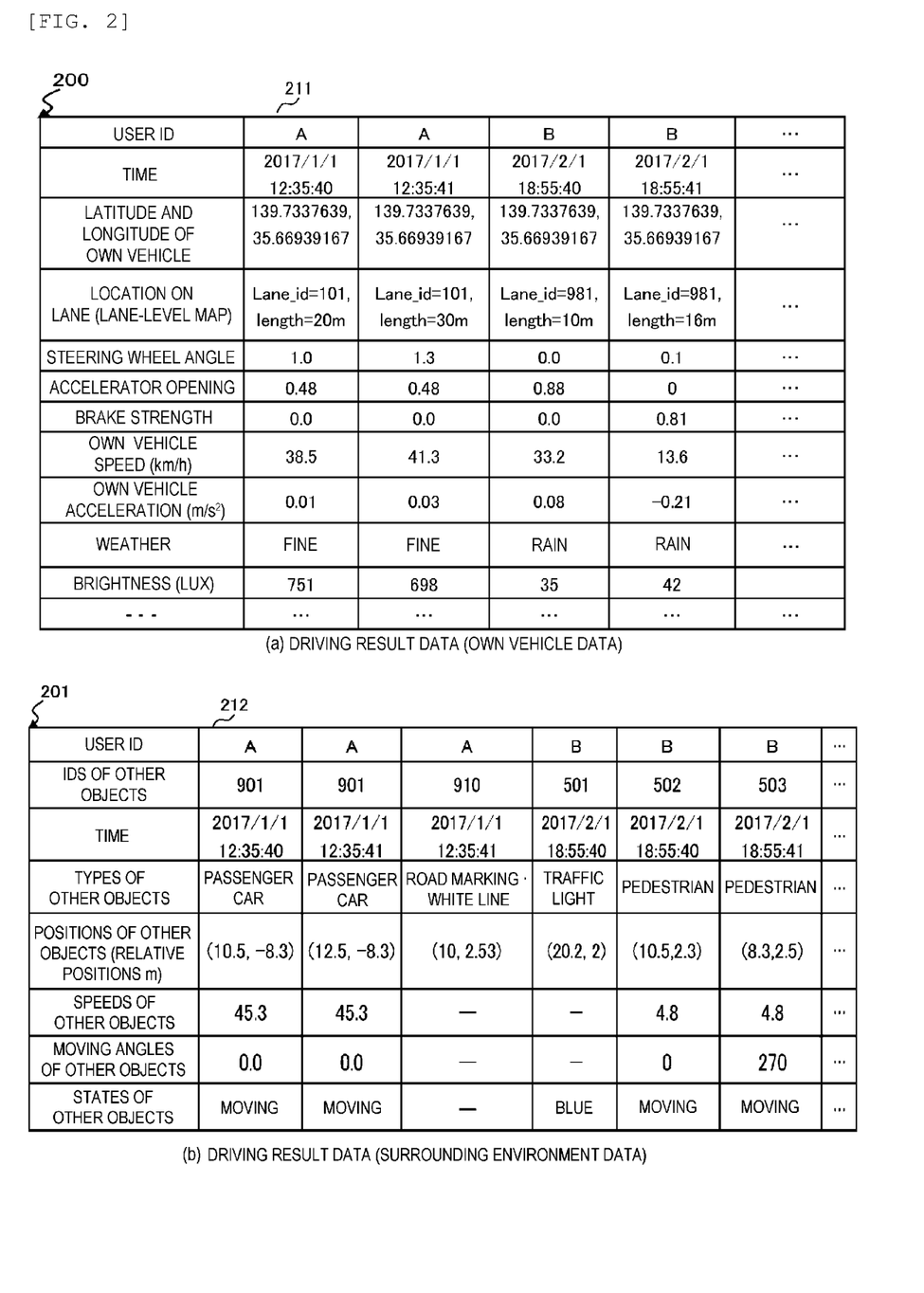
FIG. 2(a) is a diagram showing an example of own vehicle running data 200 among driving result data.
FIG. 2(b) is a diagram showing an example of surrounding environment data 201 among the driving result data.

FIG. 2 illustrates diagrams showing an example of a driving result stored in the data accumulating unit 11. FIG. 2(*a*) is a diagram showing an example of own vehicle running data 200 among driving result data, and FIG. 2(*b*) is a diagram showing an example of surrounding environment data 201 among the driving result data.

One record of the own vehicle running data 200 shown in FIG. 2(*a*) includes state information of one vehicle acquired by the electronic control device 20 of the vehicle at a certain time. Specifically, each record includes a user ID, a time, an own vehicle location (latitude and longitude), a location on a lane, a steering wheel angle, an accelerator opening, a brake strength, a vehicle speed, vehicle acceleration, weather, and brightness.

The user ID is information that uniquely identifies each electronic control device 20, and in the present embodiment, the user ID also serves as a driver identification for convenience. In the present embodiment, a one-letter alphabet of A, B, C, and the like is used as the user ID. Hereinafter, the user whose user ID is "A" is also referred to as a "user A". The time is a time when each electronic control device 20 acquires information. The own vehicle latitude and longitude is location information of the vehicle acquired by each electronic control device 20 at each time, that is, a coordinate value. The steering wheel angle is an angle at which the steering wheel is rotated. The accelerator speed is a ratio at which the accelerator is stepped on, and 1.0 represents the maximum stepped amount. The brake strength is a ratio at which the brake is stepped on, and 1.0 represents the maximum stepped amount. The own vehicle speed is a running speed of the vehicle. The own vehicle acceleration is a running acceleration of the vehicle. The weather is weather at each time. The brightness is brightness at each time.

The description in FIG. 2(a) will be specifically described. For example, a record 211 shows that the latitude and longitude that are acquired by the electronic control device 20 identified by the user ID "A" at 12:35:40 on Jan. 1, 2017 are 139.7337639 degrees and 35.66939167 degrees, respectively. The record 211 shows that, the vehicle equipped with the electronic control device 20 at that time has a steering wheel angle of 1.0 degree, an accelerator opening of 0.48, a brake strength of 0.0, an own vehicle running speed of 38.5 km/h, and vehicle acceleration of 0.01 m/s2, and that the weather is fine and the brightness is 751 lux.

One record of the surrounding environment data 201 shown in FIG. 2(b) includes surrounding environment information that is acquired and recognized by a sensor connected to the electronic control device 20 of one vehicle at a certain time. Specifically, each record includes IDs of other objects, a time, types of other objects, positions of other objects, speeds of other objects, moving angles of other objects, and states of other objects.

The IDs of other objects are information that uniquely identifies a peripheral object recognized by the sensor. The ID of an object recognized as the same does not change even if the time changes. The time is a time when each electronic control device 20 acquires information. The types of other objects are information indicating a type of the object recognized by the sensor. The positions of other objects are relative positions from the own vehicle to other objects. The speeds of other objects are moving speeds of other objects. The moving angles of other objects are moving directions of moving objects, and a running direction of the vehicle is 0 degree. The states of other objects indicate whether a moving object moves, and a state of an object whose state changes, such as a traffic light.

The description of FIG. 2(b) will be specifically described. For example, a record 212 shows that another object identified by an ID "901" of the other object is a passenger car. The other object is recognized by the electronic control device 20 of the electronic control device 20 identified by a user ID "A" at 12:35:40 on Jan. 1, 2017. The other object is at a relative position of 10.5 m ahead and 8.3 m to the right, and is moving in the same direction as the running direction of the vehicle at a speed of 45.3 km/h.

(Lane-Level Autonomous Driving Map)

Figure 3:
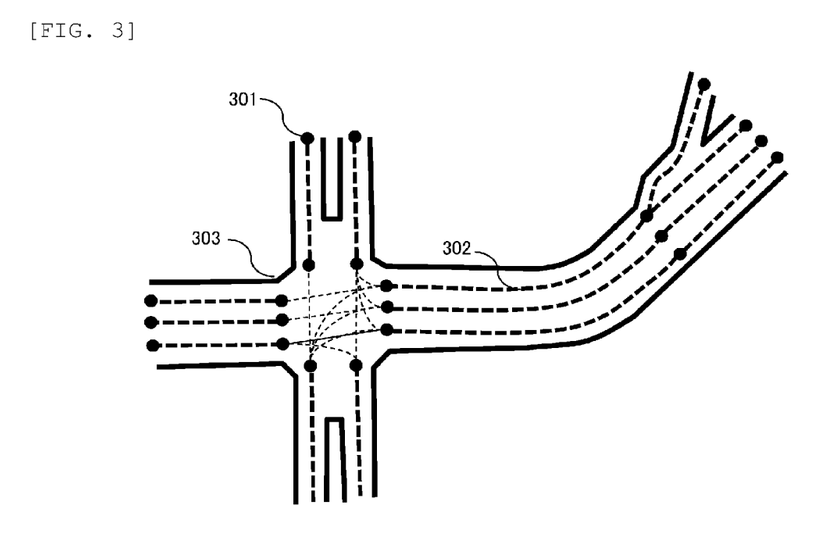
FIG. 3 is a diagram showing an example of a lane-level autonomous driving map.

FIG. 3 shows an example of a lane-level autonomous driving map. This is an example of an autonomous driving map at an intersection and a branch of a road. Each lane is represented by a lane link 302 representing a center line of the lane and a lane node 301 which is a branch point or an end point of the lane. In FIG. 3, all black circles including 301 are lane nodes, and dotted lines including 302 are lane links. Inside the intersection, lane links are set only in directions in which the vehicle can travel. Solid lines including 303 are boundaries of roadways. In FIG. 3, a road in an upper-lower direction is a road having one lane on each side with left-hand traffic. The road in a left-right direction is a one-way road having three lanes from left to right. As shown in the upper right of FIG. 3, the leftmost lane has a branch.

(Personal Characteristic Data)

FIG. 4(a) is a diagram showing an example of personal characteristic data at a certain place, and FIG. 4(b) is a diagram showing target places of the personal characteristic data shown in FIG. 4(a). In FIG. 4(b), dotted lines having symbols 401, 402, 403, and 404 are lane links, and black circles such as 405 are all lane nodes.

Personal characteristic data 420 shown in FIG. 4(a) is associated with lane links of a merging lane shown in FIG. 4(b), and describes optimum vehicle control (operation) conditions and control contents in the lane when a vehicle is controlled using the personal characteristic data 420. Specifically, one record of the personal characteristic data 420 records a lane number and a serial number corresponding to the data to be analyzed, an application condition of a control content, and the control content. The lane number indicates a position where the own vehicle is present. The serial number is a serial number for each lane number set for convenience.

Figure 4:
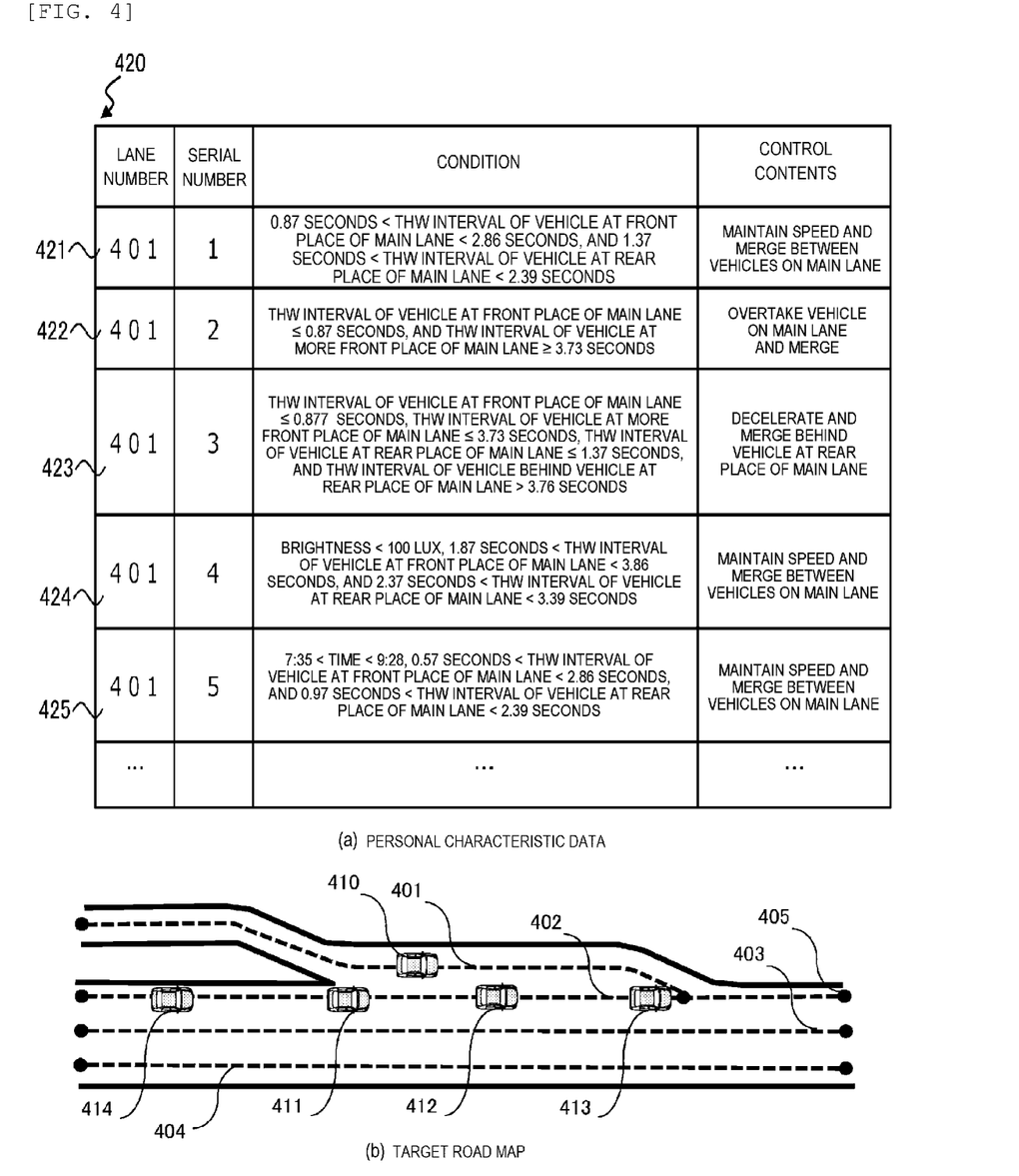
FIG. 4(a) is a diagram showing an example of personal characteristic data at a certain place.
FIG. 4(b) is a diagram showing target places of the personal characteristic data shown in FIG. 4(a).

In an example of a merging lane in FIG. 4, the personal characteristic data of the lane 401 is applied. In this example, an own vehicle is a vehicle indicated by a symbol 410, a vehicle at a front place of the main lane is a vehicle indicated by a symbol 412, a vehicle at a more front place of the main lane is a vehicle indicated by a symbol 413, a vehicle at a rear place of the main lane is a vehicle indicated by a symbol 411, and a vehicle behind the vehicle at the rear place of the main lane is a vehicle indicated by a symbol 412. A THW interval used in the condition is a value in seconds called time head way, and is a value obtained by dividing an absolute value of a distance to an opponent by an absolute value of the own vehicle speed. This is a parameter that can be regarded as a temporal distance between vehicles.

A record 421 of the personal characteristic data 420 shows an instruction to control the own vehicle 410 so that the own vehicle 410 maintains the speed and merges between the vehicle 411 at the rear place of the main lane and the vehicle 412 at the front place of the main lane when the THW interval of the vehicle 412 on the main lane is between 0.87 seconds and 2.86 seconds and the THW interval of the vehicle 411 on the main lane is between 1.37 seconds and 2.39 seconds. A record 422 of the personal characteristic data 421 shows an instruction to control the own vehicle 410 so that the own vehicle 410 overtakes the vehicle 412 at the front place of the main lane and merges when the THW interval of the vehicle 412 on the main lane is 0.87 seconds or less and the THW interval of the vehicle 413 at the more front place of the main lane is 3.73 seconds or more.

A record 423 of the personal characteristic data 420 shows an instruction to control the own vehicle 410 so that the own vehicle 410 decelerates and merges behind the vehicle 411 at the rear place of the main lane when the THW interval of the vehicle 412 at the front place of the main lane is 0.87 seconds or less, the THW interval of the vehicle 413 at the more front place of the main lane is 3.73 seconds or less, the THW interval of the vehicle 411 at the rear place of the main lane is 1.37 seconds or less, and the THW interval of the vehicle 414 behind the vehicle at the rear place of the main lane is 3.76 seconds or more.

A record 424 of the personal characteristic data 420 shows an instruction to control the own vehicle 410 so that the own vehicle 410 maintains the speed and merges between the vehicle 411 at the rear place of the main lane and the vehicle 412 at the front place of the main lane when the brightness is 100 lux or less, the THW interval of the vehicle 412 on the main lane is between 1.87 seconds and 3.86 seconds, and the THW interval of the vehicle 411 on the main lane is between 2.37 seconds and 3.39 seconds. The record 425 of the personal characteristic data 420 shows an instruction to control the own vehicle 410 so that the own vehicle 410 maintains the speed and merges between the vehicle 411 at the rear place of the main lane and the vehicle 412 at the front place of the main lane when the time is between 7:35 and 9:28, the THW interval of the vehicle 412 on the main lane is between 0.57 seconds and 2.86 seconds, and the THW interval of the vehicle 411 on the main lane is between 0.97 seconds and 2.39 seconds.

The above description with reference to FIG. 4 is an example of certain personal characteristic data at a certain place. The server 10 stores personal characteristic data of a plurality of users at a plurality of places.

Figure 5:
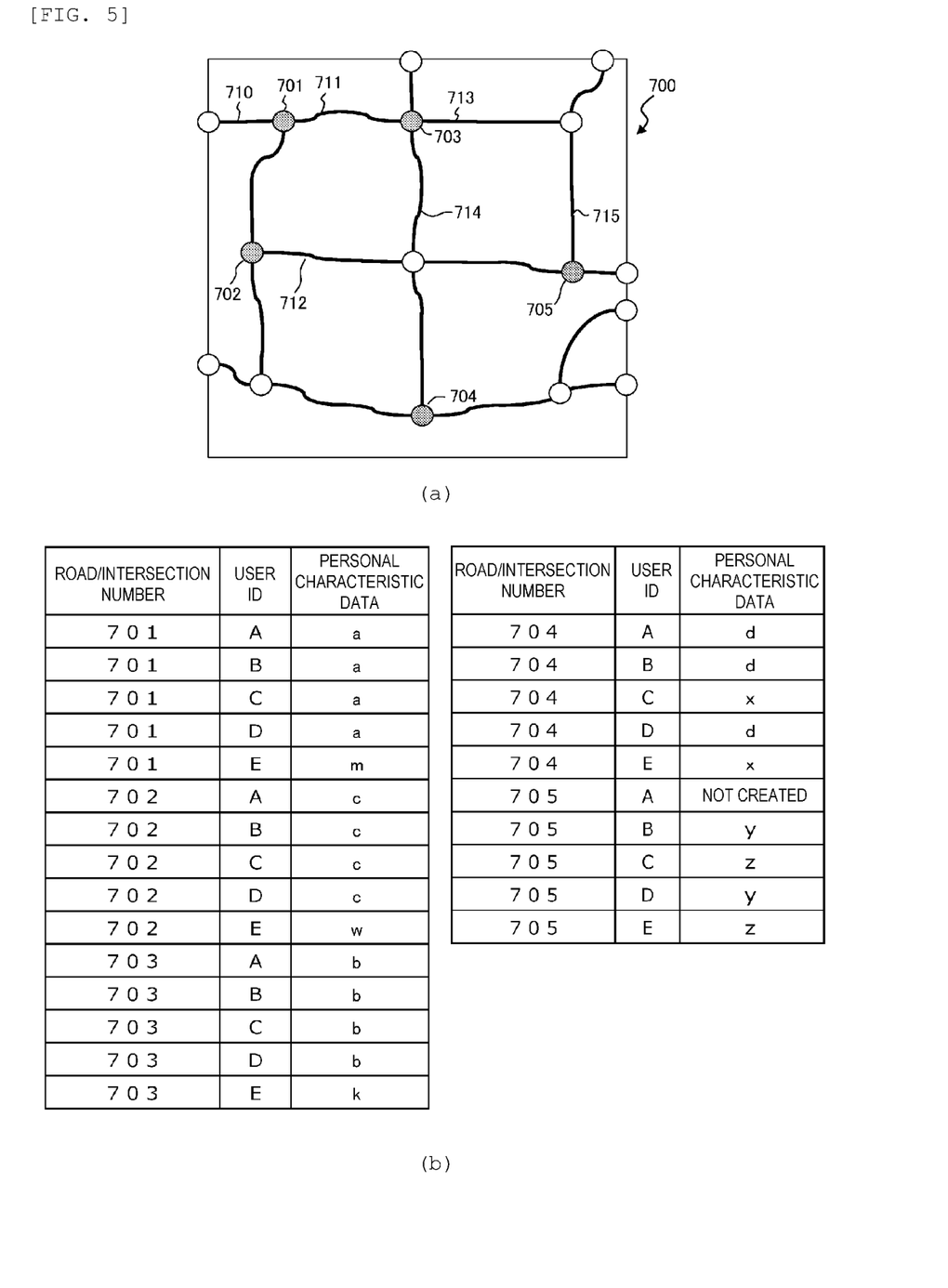
FIG. 5(a) is a diagram showing an example of the autonomous driving map.
FIG. 5(b) is a diagram showing an example of personal characteristic data of a plurality of users at a plurality of places.

FIG. 5 illustrates diagrams showing the personal characteristic data stored in the server 10. FIG. 5(*a*) is a diagram showing an example of an autonomous driving map, and FIG. 5(*b*) is a diagram showing an example of the personal characteristic data of a plurality of users at a plurality of places. However, the example shown in FIG. 5(*b*) shows the personal characteristic data at a stage where a first stage described later is completed and processing in a second stage is not performed.

In FIG. 5(*a*), black lines indicated by symbols 710, 711, 712, 713, 714, 715 and the like mean roads, and circles indicated by symbols 701, 702, 703, 704, 705 and the like mean intersections. The autonomous driving map has a lane-level detail as shown in FIG. 3, but in FIG. 5(*a*), for simplification of the description, the description will be given using a road-level diagram. Therefore, a black-line road includes a plurality of lanes, and a circled intersection includes a plurality of lanes within the intersection. Each piece of the personal characteristic data obtained by the above-mentioned analyzing of the driving result data is associated with a respective one of the lanes. The roads and intersections in FIG. 5(*a*) also hold the personal characteristic data of a plurality of drivers for each lane in the roads and intersections. This association is generally made using a lane number and a user ID, but the invention is not limited to that method.

FIG. 5(*b*) shows an example of personal characteristic data at each intersection or road, that is, at each place. Here, only states of intersections 701, 702, 703, 704, and 705 are shown. In the personal characteristic data at each place, a plurality of conditions and control contents are defined for each driver and for each lane as shown in FIG. 4(*a*), but here, for simplification of the description, the personal characteristic data for drivers is shown in lowercase letters. The same letters mean the same personal characteristic data.

In an example shown in FIG. 5(*b*), at intersections 701, 702, 703, and 704, personal characteristic data of users A, B, C, D, and E has been created, and at intersection 705, personal characteristic data of users B, C, and D has been created, but personal characteristic data of user A has not been created. At intersections 701, 702, 703, and 704, the four users A to D have the same personal characteristic data. At the intersection 705, as described above, the personal characteristic data of the user A has not been created, the personal characteristic data of the user B and the personal characteristic data of the user D are the same as "y", and the personal characteristic data of the user C is "z".

(Creation of Personal Characteristic Data)

The creation of the personal characteristic data is divided into two stages. In the first stage, the personal characteristic data is created using driving result data collected for each user and each place. In the first stage, driving result data of places where users are not manually driving is not created. In the second stage, driving result data of other users is used to create personal characteristic data of a processing target of a place where users are not driving. Processing in the second stage starts after processing in the first stage is completely completed. It is desirable to execute these pieces of processing in advance by batch processing or the like at night.

Even when the driving result data is recorded, if the number of running is less than a predetermined threshold value, processing in the first stage does not need to be executed. This is because when the number of running is small, the number of patterns of a positional relation or the like with other vehicles is also small, and it may not be possible to deal with all situations that may occur on that spot. It is also desirable to change the number of running serving as a reference at different locations such as a simple merger and an intersection of a complex five-forked road or six-forked road.

Figure 6:
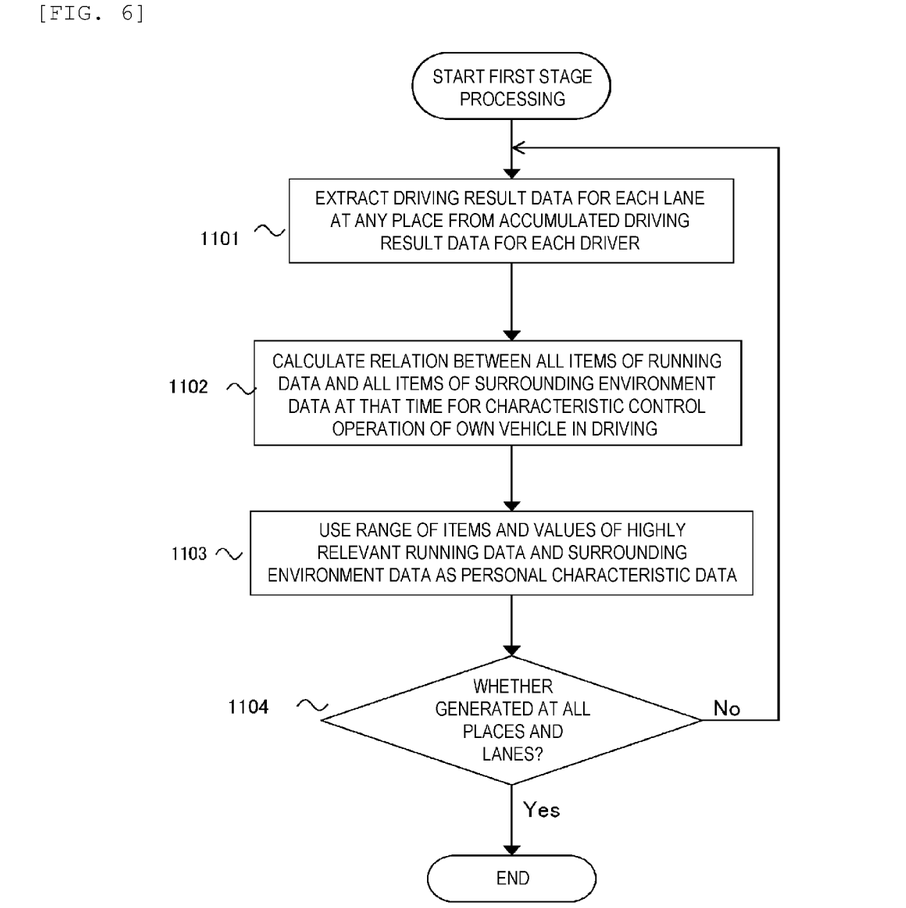
FIG. 6 is a flowchart showing a first stage of personal characteristic data creation.

FIG. 6 is a flowchart showing processing of creating personal characteristic data using the accumulated driving result data by the personal characteristic creating unit 13. An execution subject of the processing described below is the personal characteristic creating unit 13. First, the personal characteristic creating unit 13 extracts, for each driver, driving result data for each lane at each place from the accumulated driving result data (step 1101). This extracted driving result data includes a record in the own vehicle data 200, which is the control (operation) contents of the own vehicle obtained by running a plurality of times, and a record in the surrounding environment data 201 that indicates situations of a surrounding object and the like observed by the vehicle.

Next, the personal characteristic creating unit 13 calculates relations between all items of the own vehicle data and all items of the surrounding environment data at that time for a characteristic control operation of the own vehicle in driving for the above-mentioned data (step 1102). The relations are calculated as follows. For example, in a merging operation, a steering wheel operation is performed as one of characteristic control operations of the own vehicle. In this case, first, when a steering wheel angle is large as in a case of the merging operation and when the steering wheel angle is small as in a case of parallel running on the main lane, presence or absence of a difference (relation) in distribution of values of the items in the surrounding environment data and conditions under which the difference occurs are examined. This is performed for all the items of the surrounding environment data and all the items of the own vehicle data.

In this processing, the surrounding environment data and the own vehicle data in which a difference has been found in distribution are characteristic conditions when a steering wheel is operated, that is, the merging operation is performed. It can be determined that if the difference in distribution is large, the relation with the steering wheel operation, that is, the merging operation is strong. Therefore, the personal characteristic creating unit 13 adopts these facts as conditions for performing the merging operation and uses these facts as personal characteristic data (step 1103).

The personal characteristic creating unit 13 calculates a strength of the relation for all the items of the surrounding environment data and the own vehicle data, and among the items, the top several items having the strongest relation are adopted as personal characteristic data. For example, in an example of merging in FIG. 4, there are many objects acquired as surrounding environment data, and the relations are calculated including information of road markings and the like as well as information on other vehicles, and the conditions shown in FIG. 4 are adopted as the items having the strongest relation.

If the personal characteristic creating unit 13 has generated personal characteristic data for all the places and lanes in which driving result data is recorded, the processing ends, and if not, the processing returns to the processing in step 1101 (step 1104). By the above processing, the personal characteristic data as shown in FIG. 4(a) can be obtained.

Figure 7:
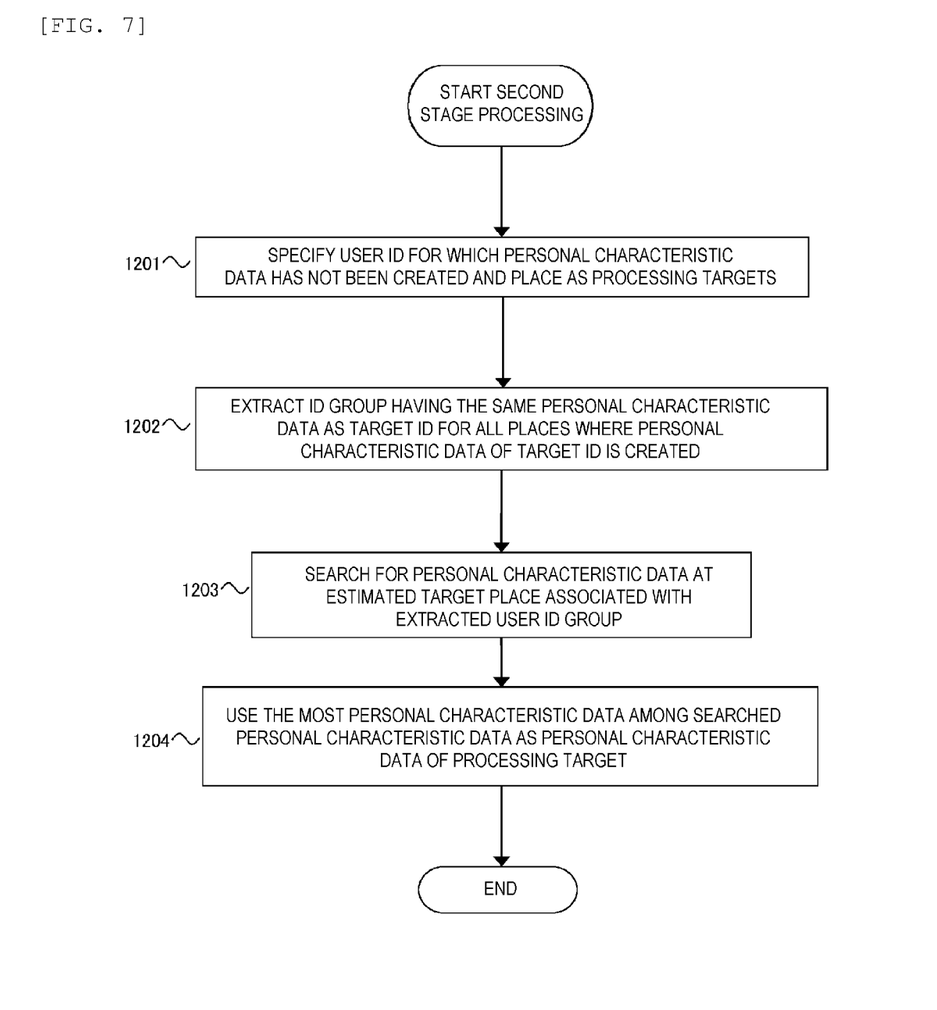
FIG. 7 is a flowchart showing a second stage of the personal characteristic data creation.

FIG. 7 is a flowchart showing the creation of personal characteristic data in the second stage. An execution subject of the processing described below is the personal characteristic creating unit 13. In the description for FIG. 7, the example shown in FIG. 5 is also used to facilitate understanding. In FIG. 7, first, a combination of a user ID for which personal characteristic data has not been created and a position on a map is specified as a processing target (step 1201). Here, using the example in FIG. 5, the user ID of the processing target will be described below as "A" and the position of the processing target will be described below as the "intersection 705". When a plurality of processing targets are present, step 1202 and subsequent steps are repeated for the number of the processing targets.

Subsequently, the personal characteristic creating unit 13 causes the similarity specifying unit 14 to execute the following processing (step 1202). That is, the similarity specifying unit 14 extracts a user ID group having the same personal identification data as the user ID of the processing target at all places where all personal identification data associated with the user ID of the processing target is created. In the example in FIG. 5, the personal characteristic data at the intersections whose symbols are 701 to 704 are referred to, and the users B and D are extracted. However, in step 1202, only the user ID group having a ratio at which personal characteristic data matches is a predetermined ratio or more, for example, 80% or more, may be extracted. For example, the users B and D are 100% matched with the user A because the personal characteristic data of the users B and D and the user A matches in all of the symbols 701 to 704, and the user C is 75% matched with the user A because the personal characteristic data of the user C and the user A matches only in symbols 701 to 703. Therefore, on a condition of matching of 80% or more, only users B and D are extracted.

Next, the personal characteristic creating unit 13 searches for personal characteristic data at an estimated target position associated with the user ID group extracted in step 1202 (step 1203). In the example in FIG. 5, personal characteristic data y and y at the intersection 705 are extracted for the users B and D. Finally, the personal characteristic creating unit 13 uses the most characteristics among the personal characteristic data obtained by performing searching as the personal characteristic data of the processing target (step 1204). In the example in FIG. 5, since there are two pieces of personal characteristic data y at the intersection 705, estimated personal characteristic data of the user A at the intersection 705 is y. This completes the processing shown in FIG. 7.

(Flowchart of Vehicle Control)

Figure 8:
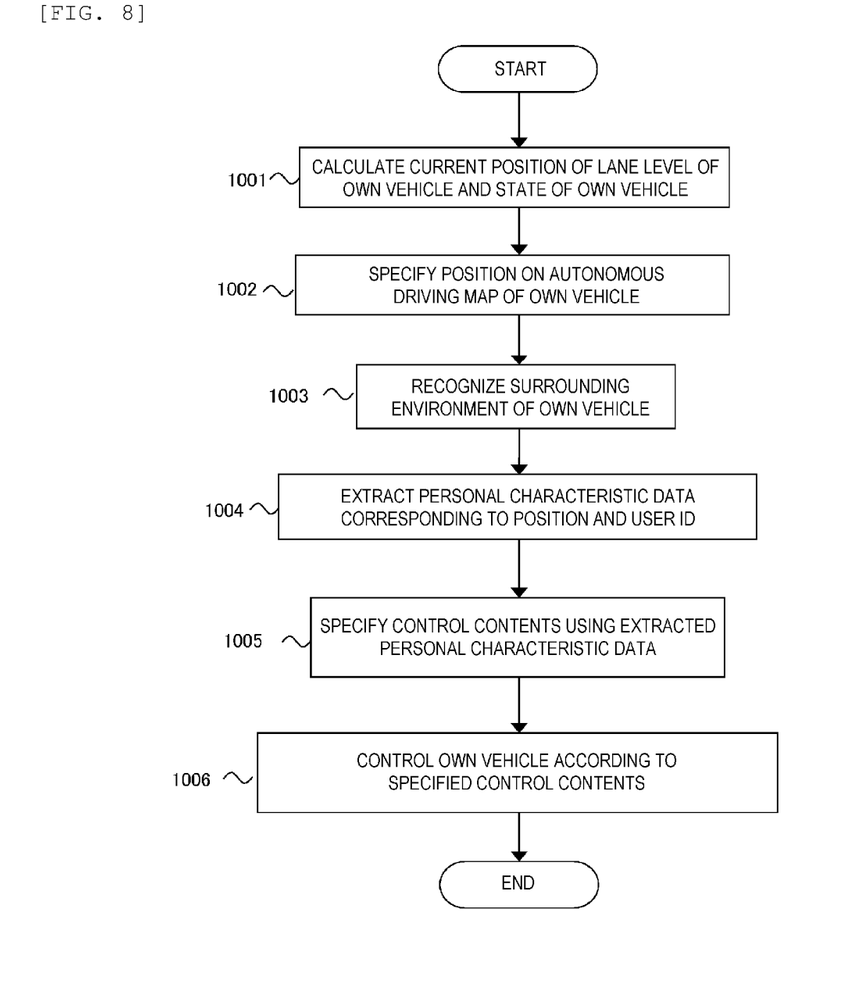
FIG. 8 is a flowchart showing vehicle control processing based on the personal characteristic data.

FIG. 8 is a flowchart showing vehicle control processing based on the personal characteristic data. The electronic control device 20 performs autonomous driving or vehicle control with reference to a downloaded autonomous driving map, surrounding environment such as other vehicles, pedestrians, road markings, and traffic lights recognized by a radar, a camera, or the like connected to the external I/F 25, and the personal characteristic data downloaded to a vehicle control logic storage unit. An execution subject of steps of the flowchart described below is the vehicle control unit 24.

First, a current position of the lane level of an own vehicle is calculated, and a state (a speed, an accelerator/steering wheel state, and the like) of the own vehicle is recognized and calculated (step 1001). Next, the lane on which the own vehicle is presented on the autonomous driving map is calculated (step 1002). Further, using recognition results and the like from the in-vehicle sensor, data on the surrounding environment of the own vehicle, that is, the position, the speed, and the like of other vehicles, is acquired (step 1003).

Subsequently, the personal characteristic data corresponding to the lane on which the own vehicle is currently present is extracted from the local storage unit 26 (step 1004). In the following step 1005, based on the extracted personal characteristic data, control contents corresponding to applicable conditions are specified. The applicable conditions match the conditions of the state of the own vehicle such as the speed and the position on the lane and the surrounding environment such as the position and the speed of other vehicles.

Then, control operations (the steering wheel operation, the accelerator operation, and the like) of the own vehicle are performed according to the control contents selected in step 1005 (step 1006). The vehicle control processing in step 1006 is repeatedly performed in an autonomous driving mode or a driving support mode. A repeat interval (for example, one second, 100 milliseconds, and the like) may be any repeat interval and is set based on performances of a system and required specifications.

According to the first embodiment described above, the following effects can be attained.

(1) The update system S includes the electronic control device 20 that stores the autonomous driving logic and the server 10. The server 10 includes: the data accumulating unit 11 of a storage unit configured to store, in association with each combination of a user ID that identifies a user and a position on a road, personal characteristic data that is a part of the autonomous driving logic based on driving of a user and driving result data that is a record of driving of a user; the personal characteristic creating unit 13 configured to create the personal characteristic data; the similarity specifying unit 14 configured to specify, for each target ID which is the user ID to be evaluated for similarity, a user ID associated with the personal characteristic data or the driving result data, which is highly similar to the personal characteristic data or the driving result data associated with the target ID at a plurality of places; and the output unit 15 configured to output the personal characteristic data created by the personal characteristic creating unit 13 to the electronic control device 20. The personal characteristic creating unit 13 creates, for example, personal characteristic data that is associated with the user ID "A" and the intersection 705, and is "not created" in FIG. 5(b) as follows. That is, if the driving result data associated with the user ID "A" and the intersection 705 is present, as shown in the flowchart in FIG. 6, personal characteristic data is created using the driving result data of the user at that place. If driving result data associated with the user ID "A" and the intersection 705 is not present, as shown in the flowchart in FIG. 7, personal characteristic data is created using the driving result data associated with the user IDs "B to D" specified for the user ID "A" by the similarity specifying unit 14 and the intersection 705. The electronic control device 20 includes the personal characteristic updating unit 23 configured to update the autonomous driving logic using the personal characteristic data created by the personal characteristic creating unit 13.

Therefore, it is possible to control a vehicle according to characteristics of a user even on a road where the user is not manually driving. Accordingly, appropriate vehicle control and autonomous driving according to the position and the surrounding environment at that time, including differences in lanes, can be performed by reflecting individual driving characteristics. For example, as in the example shown in FIG. 5, if driving result data for the intersection 705 of user A is not present and information of other users is not used, personal characteristic data at the intersection 705 cannot be created. However, the personal characteristic creating unit 13 can create personal characteristic data of user A for the intersection 705 using personal characteristic data of other people that is associated with the user ID whose characteristics are similar to those of the user A and is specified by the similarity specifying unit 14.

(2) The similarity specifying unit 14 specifies the user ID in which the number of places where personal characteristic data is similar exceeds a predetermined threshold value (step 1202 in FIG. 7). Therefore, the similarity specifying unit 14 can specify users having similar characteristics with high accuracy.

(3) The electronic control device 20 includes the local storage unit 26 that has an autonomous driving logic including, for a plurality of positions, personal characteristic data created for each user in association with a position on a road, the network IF 21 to which the personal characteristic data is received from the server 10, the personal characteristic update unit 23 configured to update the autonomous driving logic using the personal characteristic data input to the network IF 21, the vehicle control unit 24 configured to control a vehicle using the autonomous driving logic, and the network IF 21 configured to output driving result data including position information, which is a record of driving when the vehicle is driven by an operation of a user, to the server together with information for identifying a user. The personal characteristic data input from the server 10 includes the personal characteristic data for a place where a vehicle is not driven by an operation of the user, which is the personal characteristic data created based on the personal characteristic data or the driving result data of another user whose personal characteristic data or driving result data is similar to that of the user at a plurality of places. Therefore, the electronic control device 20 can control a vehicle according to characteristics of a user even on a road where the user is not manually driving.

(Modification 1)

The method for determining personal characteristic data in step 1204 in FIG. 7 is not limited to a simple majority vote. New personal characteristic data may be created by calculating a numerical value that is a threshold value by weighting by a simple average, the number of running, or the like.

(Modification 2)

A criteria for determining that the personal characteristic data is the same in step 1202 in FIG. 7 does not require exact matching. For example, a similarity may be defined, and the personal characteristic data may be considered to be the same as long as a similarity of the personal characteristic data is within a certain range of the similarity. As an example of the similarity, as shown in FIG. 4, a plurality of conditions are set for the personal characteristic data even in one lane. Therefore, the number of matching conditions among a plurality of conditions can also be defined as a similarity. A closeness of a threshold value included in each condition may be quantified and a similarity may be defined based on the quantified closeness.

(Modification 3)

Personal characteristic data does not have to be created for all roads and intersections. For example, personal characteristic data does not need to be created in a place where a difference in a vehicle operation for each driver is unlikely to occur, such as a straight road, or in a place where it is unlikely to feel discomfort even if vehicle operations are different. In this case, in a place where personal characteristic data is not created, a vehicle is controlled according to a control method which is determined in advance for any user. Accordingly, processing load can be reduced.

(Modification 4)

In step 1204 in FIG. 7, pre-created personal characteristic data that is considered standard may be selected. For example, if it is determined that the personal characteristic data associated with the ID extracted in step 1202 and the personal characteristic data associated with the user ID of the processing target have low similarity, the pre-created personal characteristic data that is considered standard may be selected without executing steps 1203 and 1204.

(Modification 5)

When a driver operates a steering wheel or a brake during autonomous driving, the electronic control device 20 may determine that the personal characteristic data at that place currently set for the driver is inappropriate, and notify the server 10 of that fact. In this case, the server 10 specifies the personal characteristic data determined to be inappropriate, removes the personal characteristic data, and performs the processing shown in FIG. 8 to determine alternative personal characteristic data.

(Modification 6)

In the above-described embodiment, personal characteristic data of other users is specified in step 1204 in FIG. 7, and in step 1005 and below in FIG. 8, the personal characteristic data of other users is used as it is to control a vehicle. However, personal characteristic data may be created again using the driving result data of the user specified in step 1204, and the created personal characteristic data may be used in step 1005 and below in FIG. 7.

If only one user is specified in step 1204 in FIG. 7, the same personal characteristic data is only created using the method according to the present modification. However, if a plurality of users is specified in step 1204 in FIG. 7, it is possible that more appropriate personal characteristic data can be created by creating personal characteristic data again using the driving result data of a plurality of users.

(Modification 7)

In step 1203 in FIG. 7, driving result data of a road shape similar to a structure of a road at the place of processing target may be further considered. In a similarity of structures of roads, the number of lanes, a road width, presence or absence of grade separation, and the like are considered. When structures of roads are similar, it is assumed that not only the user of the processing target but also various people drive in the same way, and thus, using the personal characteristic data on roads having similar structures, it is possible to create personal characteristic data of places having low traffic volume.

For example, in the example shown in FIG. 5, when no personal characteristic data of the intersection 705 is present and the structure of the road at the intersection 704 and the structure of the place at the intersection 705 are similar, processing is performed as follows. That is, since the structures of the roads are similar, the personal characteristic data at the intersection 705 is regarded as the same as the personal characteristic data at the intersection 704 for the users B to E. Then, since the users B to D are extracted in step 1202 as described above, d, x, and d are specified in the personal characteristic data, and the most d among these three is extracted in step 1204.

According to the present modification described above, the following effect can be attained.

(4) For example, if the driving result data associated with the user A and the intersection 705 is not present, the personal characteristic creating unit 13 creates the personal characteristic data of the user A by further using the personal characteristic data at a position where a structure of a road is similar to that of the intersection 705. Therefore, personal characteristic data can be created using information on roads having similar shapes.

(Modification 8)

In the present modification, the server 10 evaluates differences in personal characteristic data for each user at each place, and specifies a place where the majority of users have substantially the same personal characteristic data as a similar behavior shape. For example, when 90% of personal characteristic data of users running at a certain intersection has a similarity equal to or higher than a predetermined threshold value, a shape of this place is specified as a similar behavior shape. Then, the personal characteristic data of the users who do not have the driving result data at that place is used as the personal characteristic data whose similarity is equal to or higher than the predetermined threshold value.

For example, 90% of personal characteristic data of various users at a certain place Y has a similarity with the personal characteristic data of the user B exceeding the predetermined threshold value. Then, when the user C does not have the driving result data at the place Y, the personal characteristic creating unit 13 uses the personal characteristic data of the user C as the personal characteristic data of the user B. This is because when the majority of users perform the same behavior, personal characteristic data of other new users, for example, the user C, is likely to be the same as that of the majority of users.

According to the modification described above, the following effect can be attained.

(5) The personal characteristic creating unit 13 specifies a similar behavior shape that is a road shape. In the road shape, a ratio of users, whose similarities of the personal characteristic data are equal to or higher than the predetermined threshold value, is equal to or higher than a predetermined threshold value. When a first position corresponds to the similar behavior shape, the personal characteristic creating unit 13 uses any piece of the personal characteristic data whose similarity is equal to or higher than the predetermined threshold value as first personal characteristic data. Therefore, calculation of personal characteristic data can be saved.

The modifications described above may be combined with one another. Although various modifications have been described above, the invention is not limited to contents of the modifications. Other embodiments that are regarded within the scope of the technical idea of the invention are also included within the scope of the invention.

A disclosed content of the following priority basic application is incorporated herein as reference.

JP 2018-158798 (Aug. 27, 2018)

REFERENCE SIGN LIST

10 server
11 data accumulating unit
12 wide-area map storage unit
13 personal characteristic creating unit
14 similarity specifying unit
15 output unit
16 map data storage unit
17 processor
18 memory
20 electronic control device
21 network IF
22 distribution requesting unit
23 personal characteristic updating unit
24 vehicle control unit
26 local storage unit
27 local map storage unit

The invention claimed is:

1. An update system comprising an electronic control device configured to store an autonomous driving logic and a server, wherein
the server includes:
a storage unit configured to store, in association with each combination of a user ID that identifies a user and a position on a road, personal characteristic data that is a part of the autonomous driving logic based on driving of a user and driving result data that is a record of driving of a user;
a personal characteristic creating unit configured to create the personal characteristic data;
a similarity specifying unit configured to specify, for each target ID which is the user ID to be evaluated for similarity, a user ID associated with the personal characteristic data or the driving result data which is highly similar to the personal characteristic data or the driving result data associated with the target ID at a plurality of positions; and
an output unit configured to output the personal characteristic data created by the personal characteristic creating unit to the electronic control device,
in creation of a first personal characteristic data associated with a first user ID and a first position, if first driving result data which is the driving result data associated with the first user ID and the first position is present, the personal characteristic creating unit creates the first personal characteristic data using the first driving result data, and if the first driving result data is not present, the personal characteristic creating unit creates the first personal characteristic data using the driving result data or the personal characteristic data associated with a user ID specified for the first user ID by the similarity specifying unit and the first position, and
the electronic control device includes a personal characteristic updating unit configured to update the autonomous driving logic using the first personal characteristic data created by the personal characteristic creating unit.

2. The update system according to the claim 1, wherein the similarity specifying unit specifies a user ID in which the number of positions where the personal characteristic data or the driving result data is similar exceeds a predetermined threshold value.

3. The update system according to the claim 1, wherein if first driving result data, which is the driving result data associated with the first user ID and the first position, is not present, the personal characteristic creating unit creates the first personal characteristic data by further using the driving result data at a position where a structure of a road is similar to that at the first position.

4. The update system according to the claim 1, wherein
the personal characteristic creating unit specifies a similar behavior shape that is a road shape in which a ratio of users whose similarities of the personal characteristic data are equal to or higher than a predetermined threshold value is equal to or higher than a predetermined threshold value, and, when the first position corresponds to the similar behavior shape, uses any piece of the personal characteristic data whose similarity is equal to or higher than the predetermined threshold value as the first personal characteristic data.

5. An electronic control device comprising:
a storage unit that has an autonomous driving logic including, for a plurality of positions, personal characteristic data created for each user in association with a position on a road;
an input unit to which the personal characteristic data is received from a server;
a personal characteristic update unit configured to update the autonomous driving logic using the personal characteristic data input to the input unit;
a vehicle control unit configured to control a vehicle using the autonomous driving logic; and
an output unit configured to output driving result data including position information, which is a record of driving when the vehicle is driven by an operation of a user, to the server together with information for identifying a user, wherein
the personal characteristic data input from the server includes the personal characteristic data for a position where a vehicle is not driven by an operation of the user, which is the personal characteristic data created based on the personal characteristic data or the driving result data of another user whose personal characteristic data or driving result data is similar to that of the user at a plurality of positions.

6. The electronic control device according to claim 5, wherein
the personal characteristic data input from the server is created using the personal characteristic data or the driving result data of a user whose number of positions where the personal characteristic data or the driving result data is similar exceeds a predetermined threshold value.

7. The electronic control device according to claim 5, wherein
the personal characteristic data input from the server is created using the driving result data at another position where a structure of a road is similar.

* * * * *